G. LAVERE.

Lamp-Burner.

No. 5,003. Reissued July 23, 1872.

Witnesses:

H. Shumway

A. J. Libbitz

Gilbert Lavere
Inventor
By his Attyf.

Thos. E. Earle

AM. PHOTO-LITHOGRAPHIC CO. N.Y. (OSBORNE'S PROCESS.)

UNITED STATES PATENT OFFICE.

GILBERT LAVERE, OF NEW HAVEN, CONNECTICUT.

IMPROVEMENT IN LAMP-BURNERS.

Specification forming part of Letters Patent No. 77,821, dated May 12, 1868; reissue No. 5,003, July 23, 1872.

DIVISION B.

*To all whom it may concern:*

Be it known that I, GILBERT LAVERE, of New Haven, in the county of New Haven and State of Connecticut, have invented a new Improvement in Lamp-Burners; and I do hereby declare the following, when taken in connection with the accompanying drawing and the letters of reference marked thereon, to be a full, clear, and exact description of the same, and which said drawing constitutes part of this specification, and represents, in—

Figure 1:
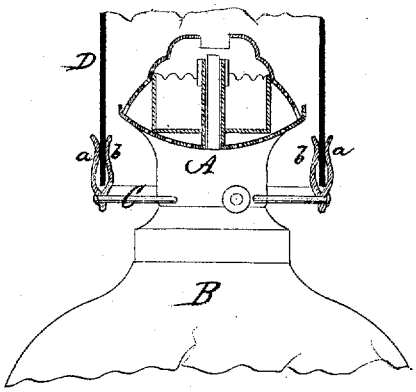
Figure 2:
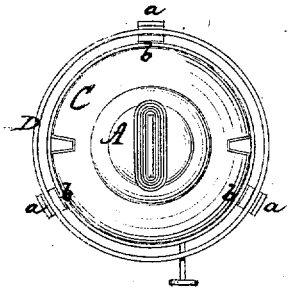

Figure 1, a vertical central section, and in Fig. 2 a plan or top view.

This invention relates to a device for supporting the chimney upon lamp-burners, the object being to clasp the chimney firmly, and yet allow of its easy removal, and at the same time adapt the securing device to chimneys which vary in thickness or diameter, it being impossible to produce chimneys of equal thickness and diameter; and the invention consists in the arrangement, upon the flange or plate which supports the chimney, of two or more spring-clamps, each composed of two jaws, both elastic, so as to receive the chimney, the two jaws of each clamp grasping the chimney, one upon the inside and the other upon the outside, yielding to accommodate different thicknesses or different diameters, or for the natural expansion and contraction of the chimney in use.

A is the burner, which may be of any known construction, and fitted to the lamp B in the usual manner. C is the base or support for the chimney, which may also be of any known or convenient construction. Upon the base or point C I arrange two or more clamps, each forming two jaws, *a b*, rising vertically from the said part C, the one, *a*, upon the outside, and the one, *b*, upon the inside, so as to receive the chimney between the two jaws. By preference I use three pairs of these spring-clamps, each of the jaws being made elastic so as to yield in a line radially from the center of the burner. The chimney D is set within the grasp of these clamps, as seen in Fig. 1, one jaw of each pair upon the inside of the chimney and the other jaw upon the outside, and these jaws made flaring at the top, so that the chimney, set on the said clamps, may be readily pressed within their grasp. Being elastic, they will yield for different thicknesses or different diameters, or for the natural contraction and expansion of the chimney, and thus avoid the necessity of fitting the chimney to the lamp, and enable the use of a variety of chimneys.

I claim as my invention—

In a lamp-burner, the arrangement of two or more pairs of elastic clamps, extending up from the base or chimney-support to grasp the chimney upon both the inner and outer surfaces, substantially as described.

GILBERT LAVERE.

Witnesses:

J. H. SHUMWAY,

A. J. TIBBITS.